US005808907A

United States Patent [19]

Shetty et al.

[11] Patent Number: 5,808,907

[45] Date of Patent: Sep. 15, 1998

[54] METHOD FOR PROVIDING INFORMATION RELATING TO A MOBILE MACHINE TO A USER

[75] Inventors: Satish M. Shetty, East Peoria; David R. Schricker; Donna J. Murr, both of Dunlap, all of Ill.

[73] Assignee: Caterpillar Inc., Peoria, Ill.

[21] Appl. No.: 760,496

[22] Filed: Dec. 5, 1996

[51] Int. Cl.[6] ..................... G01B 17/00

[52] U.S. Cl. ..................... 364/551.02; 707/1; 707/6; 707/102; 707/104; 701/29; 701/35; 340/989; 340/993

[58] Field of Search ..................... 364/551.02; 701/35, 701/29, 33, 32, 207; 340/902, 935, 989, 991, 992, 993, 996; 707/1, 6, 102, 104

[56] References Cited

U.S. PATENT DOCUMENTS

| | | | |
|---|---|---|---|
| 5,400,018 | 3/1995 | Scholl et al. | 340/825.54 |
| 5,442,553 | 8/1995 | Parrillo | 701/35 |
| 5,499,182 | 3/1996 | Ousborne | 701/35 |
| 5,521,845 | 5/1996 | Ukon et al. | 364/551.02 |
| 5,631,832 | 5/1997 | Hagenbuch | 701/35 |
| 5,648,898 | 7/1997 | Moore-McKee et al. | 701/29 |
| 5,657,224 | 8/1997 | Lonn et al. | 701/29 |

*Primary Examiner*—James P. Trammell
*Assistant Examiner*—Hien Vo
*Attorney, Agent, or Firm*—James R. Yee; W. Bryan McPherson

[57] ABSTRACT

A method for providing information relating to a machine to a user is provided. The method includes the steps of sensing predetermined events relating to the machine and producing corresponding event signals, delivering the event signals to a remote site, comparing the event signals to a profile of events corresponding to the user, and delivering a notification signal to the user if the event signals match the profile.

22 Claims, 3 Drawing Sheets

METHOD FOR PROVIDING INFORMATION RELATING TO A MOBILE MACHINE TO A USER

TECHNICAL FIELD

The present invention relates generally to mobile machines, and more particularly, to a method of providing information relating to a machine to a user.

BACKGROUND ART

Computers and electronics are becoming increasingly common on many machines. For example, earthmoving machines now include many on board sensors for recording parameter data during operation of the machine. On board controllers may also calculate other parameters of the machine based on sensor data.

However, with the large increase in the number of sensors and data being collected, the amount of data to be analyzed becomes unmanageable.

Additionally, different persons, for example, the operator, the owner, etc. . . . , may have need for different information.

The present invention is directed to overcoming one or more of the problems identified above.

DISCLOSURE OF THE INVENTION

In one aspect of the present invention, a method for providing information relating to a machine to a user is provided. The method includes the steps of sensing predetermined events relating to the machine and producing corresponding event signals, delivering the event signals to a remote site, comparing said event signals to a profile of events corresponding to the user, and delivering a notification signal to the user if the event signals match the profile.

BEST MODE FOR CARRYING OUT THE INVENTION

Figure 1:
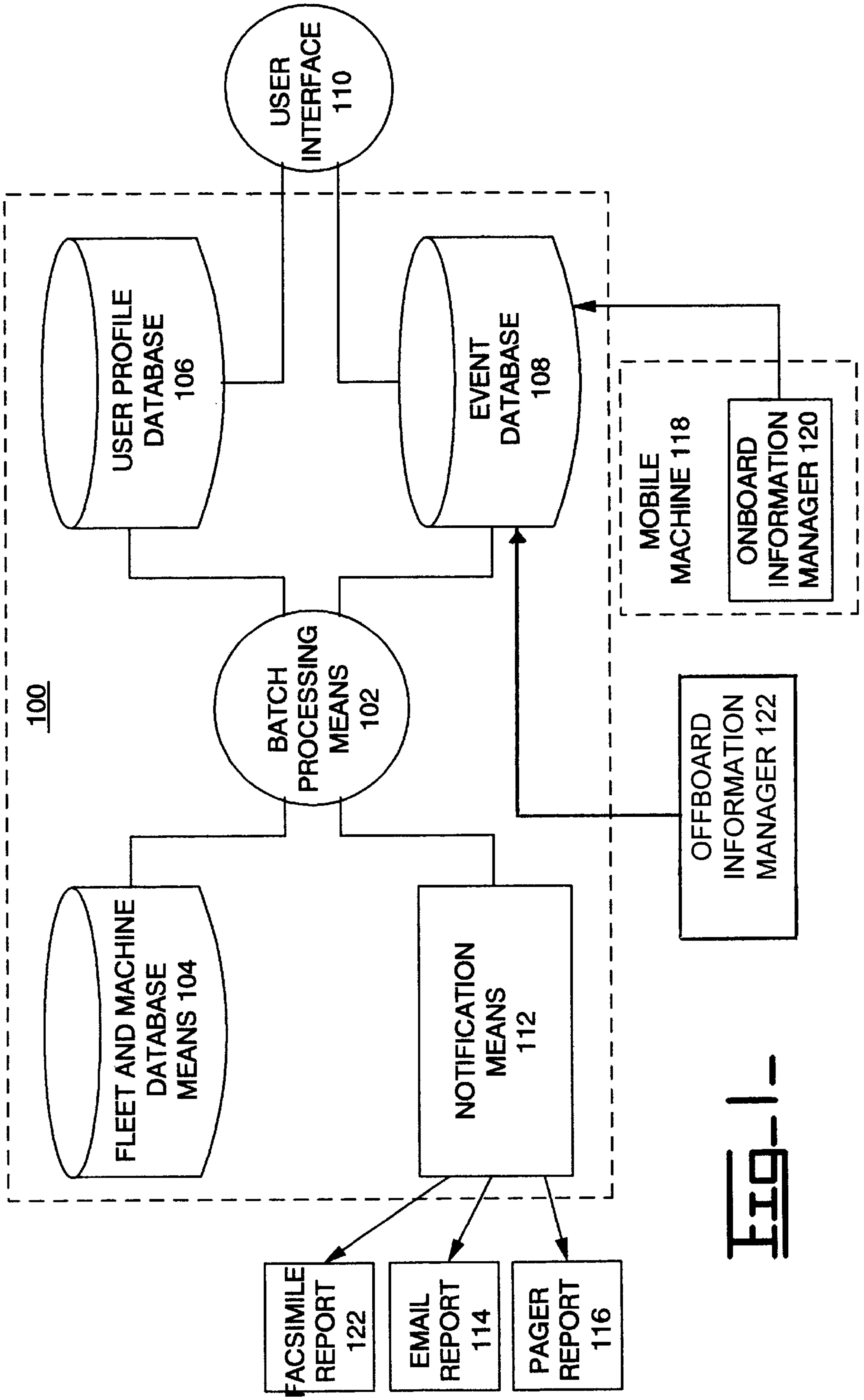
FIG. 1 is a block diagram of an apparatus adapted for performing the present invention.

With reference to FIG. 1, the present invention or warning manager 100 provides a method for providing information relating to a mobile machine in a fleet of mobile machines 118.

Each mobile machines 118 includes a plurality of on-board sensors (not shown) for measuring machine parameters. Preferably, each mobile machine 118 includes a microprocessor based controller or information manager 120 for receiving signals from the sensors, storing data when an event occurs, and calculating other machine parameters based on the sensor data.

An event is defined as a set of predetermined conditions. A particular event may be a function of one or more machine parameters. For example, one event may be defined when engine oil temperature exceeds a predetermined threshold. Another event may be defined when engine oil temperature exceeds another predetermined threshold and a sensor for detecting particles on the oil is triggered.

Generally, the information manager 120 "traps" or stores data when a predetermined event occurs or under "trapping" conditions. The parameters stored and the form of the data are dependent upon the particular event.

Preferably, the warning manager 100 is implemented on a computer workstation operating the Hewlett-Packard HP-UX operating system.

The data manager 100 includes a batch processing means 102 for receiving and analyzing the events.

A fleet and machine database means 104 contains information defining a fleet of similar or commonly owned or operated machines. The fleet and machine database means 104 also includes data relating to the number and type of all machines in the fleet.

A user profile database 106 contains information relating to all users of the data manager including a user profile which defines which events will require that the user be notified (see below).

An event database 108 contains information relating to all triggered events received from the machines in the fleet. The events stored in the event database may be received from the on-board information manager 120 in any of a number of methods, i.e., over a radio datalink, a satellite datalink, or similar method.

The event database 108 may also contain events generated by an off-board information manager 122. Preferably, the off-board information manager uses a knowledge based system to generate events based on current and past on-board data, service history, oil sample data, and the like.

A user interface 110 allows a user to access both the user profile database 106 and the event database 108. The user interface 110 also allows the user to input information relating to the fleet or machine data.

The batch processing means 102 retrieves a list of events from the event database 108 and the user profiles from the user profile database 106. The batch processing means 102 compares the list of events with the profile of each user.

If all the conditions of a user profile are met, then the user is notified, via a notification means 112. The user profile defines the events which trigger the notification and the method of notification.

In the preferred embodiment, the user may be notified by an electronic mail message or report 114 or by an pager report via a pager 116 or by a facsimile report 122.

Additionally, each user may have multiple aliases or profiles. Each alias has a different purpose and therefore a different list of events which trigger notification of the user.

For example, assume there are two users: user one and user two. Each user has two profiles: user one—profile one, user one—profile two, user two—profile one, and user two—profile two. Each profile of each user has a different set of events which must occur before the user is notified.

Each profile can be predefined for a different event or different set of events. Each profile may also trigger a different mode or modes of communication (page, Email, fax).

Figure 2:
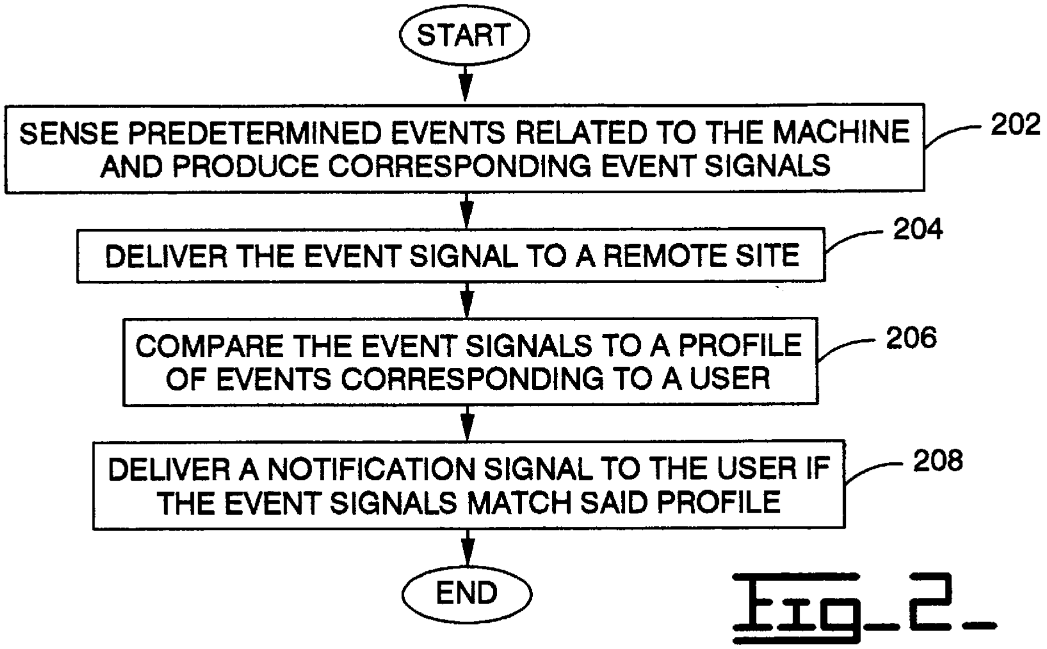
FIG. 2 is a flow diagram illustrating operation of a method for providing information to a machine to a user, according to an embodiment of the present invention.

With reference to FIG. 2, operation of the present invention will now be discussed.

In a first control block 202, each machine in the fleet is monitored via an on-board information manager 120. In the preferred embodiment, an off-board information manager 122 is also used to monitor the fleet. The information manager 120, 122 senses predetermined machine parameters and calculates other machine parameters. The parameters are stored on-board in various formats.

The information manager analyzes the data and identifies predetermined events. An event is a predetermined condition or set of conditions of the machine parameters. For example, one event may be defined as when a parameter reaches a predetermined threshold. Other events may be tied to two or more parameters.

In a second control block 204, the event or events are delivered to the data manager 100. The data manager 100 stores the events in the event database 108.

In a third control block 206, the batch processing means 102 compares the events with the user profiles stored in the user profile database 106.

In a fourth control block 208, if the conditions of an alias for a particular user are met then the user is notified, as defined in the user profile. As stated above, the user may be notified by either an electronic mail message and/or a pager message and/or facsimile.

INDUSTRIAL APPLICABILITY

With reference to the drawings and in operation the present invention provides a method for providing information relating to a mobile machine to a user.

The mobile machine is preferably one in a fleet of machines. Each machine includes an on-board information manager which collects data from a plurality of sensors and determines a number of machine parameters. The on-board information manager analyzes the parameters and detects any of a number of predetermined events.

When an event occurs it is logged, i.e., stored in memory. The events are then transmitted over a data link to a remote location.

At the remote location, the batch processing means 102 compares the events with a profile associated with a user.

Events may also be identified and logged by the off-board information manager.

If the events correspond to the events defined in the profile, then the user is notified. As stated above, notification can be by any suitable method including electronic mail and page messages.

Figure 4:
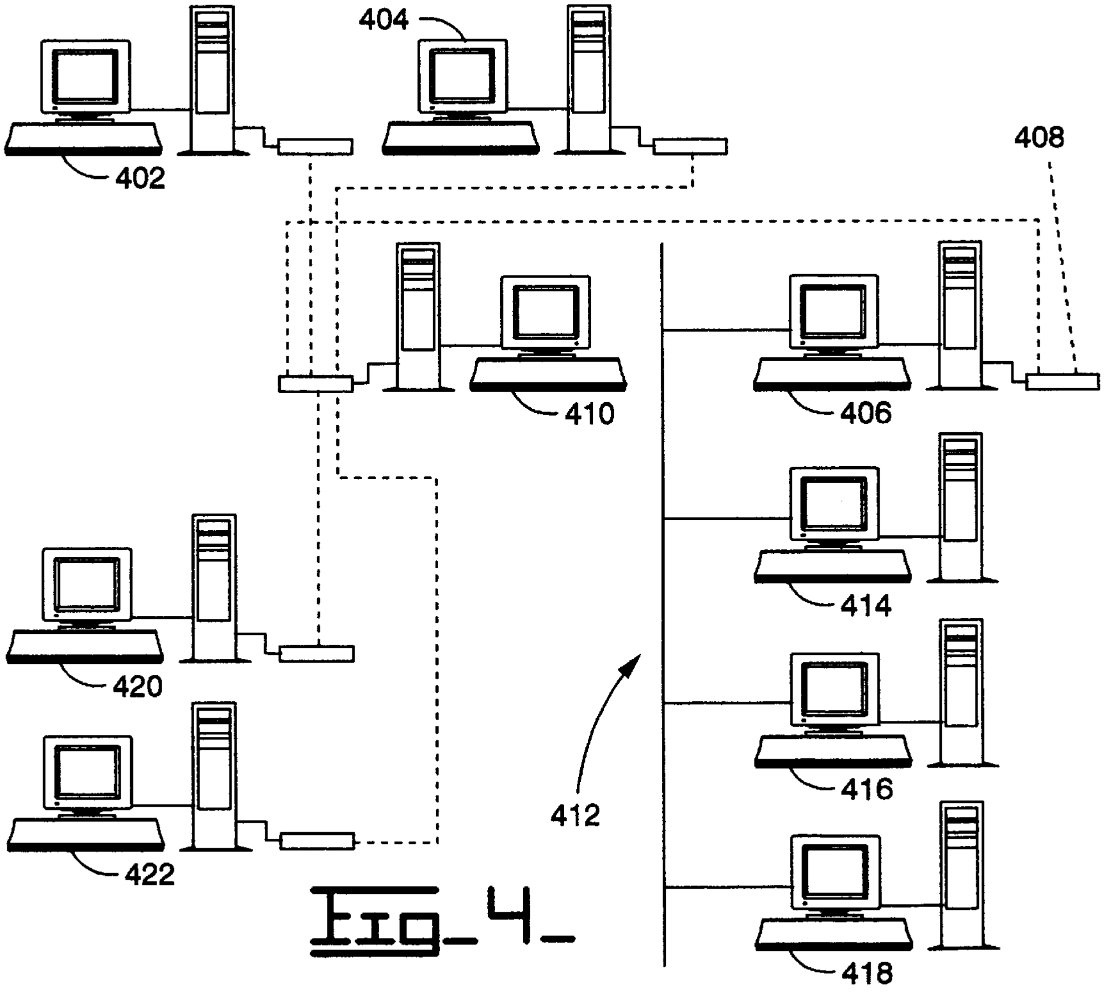
Figure 3:
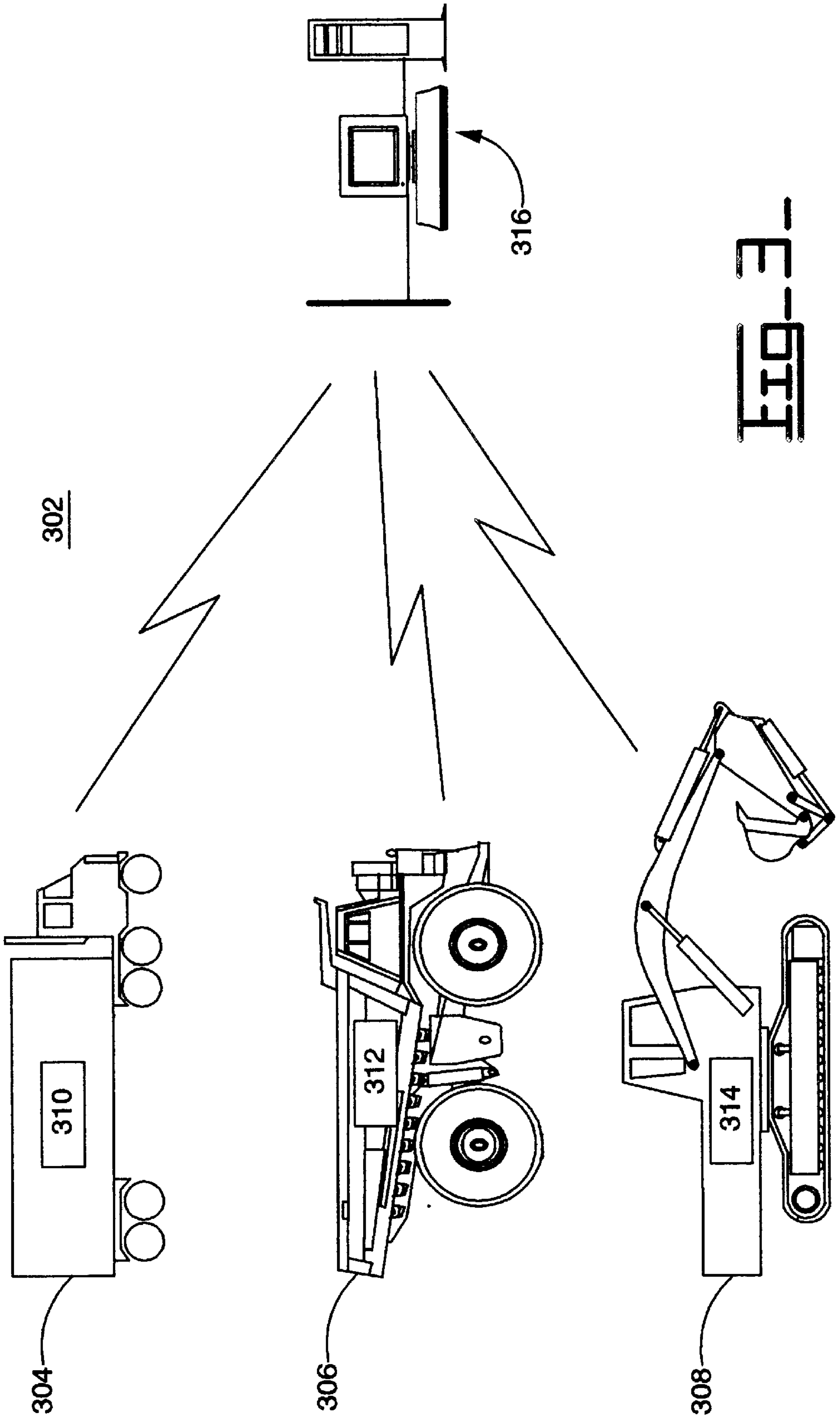
FIG. 3 is a diagrammatical illustration describing a first application of the present invention; and, FIG. 4 is a diagrammatical illustration describing a second application of the present invention.

With reference to FIG. 4, a first application of the present invention is illustrated. The application is described solely for illustration purposes. The present invention may be adapted for a variety of such systems.

Data from first, second and third mobile machines 304, 306, 308 at a work site 302 is collected by respective first, second, and third on-board information managers 310, 312, 314. The data is relayed via a communications link to a data manager 316 implemented on a computer workstation.

With reference to FIG. 4, a second application of the present invention is illustrated.

Parameter data from each machine may be collected by several different means. In the illustrated example, data from machines located at three separate sites is collected.

At a first work site, the data is collected at a first work station 402 via radio links. At a second work site, the data is collected at a second work station 404 via radio links. At a first remote site, parameter data from the third remote site is collected at a database server work station 406 over a satellite communication link.

The data collected by the first and second work stations 402, 404 are delivered to a third work station 410 at a second remote site.

The database server work station 406 is preferably connected to a computer network 412. The network 412 includes first, second, and third network computers 414, 416, 418.

Users can access the data stored on the database server work station 406 and receive electronic mail via the first, second, and third network computers 414, 416, 418.

Users can also access the data stored on the third work station 406 and receive electronic mail via first and second remote work stations 420, 422.

Events may be stored on both the third work station 410 and the database server work station 406. Each work station 406, 410 may analyze the events and notify the users as described above.

Other aspects, objects, and features of the present invention can be obtained from a study of the drawings, the disclosure, and the appended claims.

We claim:

1. A method for providing information relating to a machine to a user, comprising:

sensing predetermined events relating to the machine and producing corresponding event signals;

delivering said event signals to a remote site;

comparing said event signals to a profile of events corresponding to the user; and, delivering a notification signal to the user if said event signals match said profile.

2. A method, as set forth in claim 1, wherein said step of sensing predetermined events includes the steps of:

determining a parameter of the machine;

comparing said parameter to a threshold and wherein said predetermined events is sensed if said parameter exceeds said threshold.

3. A method, as set forth in claim 1, wherein said predetermined events are functions of at least one parameter of the machine.

4. A method, as set forth in claim 1, wherein said event signals include the occurrence of the event and related parameter data.

5. A method, as set forth in claim 1, including the steps of comparing said event signals to a second profile of events corresponding to another user; and not delivering a notification signal to said another user if said event signals do not match said second profile.

6. A method, as set forth in claim 1, wherein said event signals includes a list of said predetermined events.

7. A method, as set forth in claim 1, wherein said notification signal is an electronic mail message.

8. A method, as set forth in claim 1, wherein said notification signal is a message sent to a pager.

9. A method, as set forth in claim 1, wherein said notification signal is a message sent via facsimile.

10. A method as forth in claim 1, including the steps of:

comparing said event signals to a second profile of events corresponding to the user; and, delivering a second notification signal to the user if said event signals match said second profile.

11. A method as forth in claim 1, including the steps of:

comparing said event signals to a second profile of events corresponding to a second user; and, delivering a second notification signal to said second user if said event signals match said second profile.

12. A method, as set forth in claim 1, wherein said notification signal includes at least one of the following: an electronic mail message, a message sent to a pager and a message sent via facsimile.

13. A method, as set forth in claim 1, wherein said notification signal includes at least two of the following: an electronic mail message, a message sent to a pager and a message sent via facsimile.

14. A method, as set forth in claim 1, wherein said notification signal is defined by said profile.

15. A method as set forth in claim 1, wherein the step of delivering said event signal includes the step of delivering said event signal to said remote site using a radio datalink.

16. A method as set forth in claim 1, wherein the step of delivering said event signal includes the step of delivering said event signal to said remote site using a satellite datalink.

17. A method for providing information relating to a machine to a user, comprising:

sensing predetermined events relating to the machine and producing corresponding event signals;

delivering said event signals to a remote site;

comparing said event signals to a profile of events corresponding to the user;

delivering a notification signal to the user if said event signals match said profile;

comparing said event signals to a second profile of events corresponding to a second user; and, delivering a second notification signal to said second user if said event signals match said second profile.

18. A method as set forth in claim 17, including the steps of:

comparing said event signals to a second profile of events corresponding to another user; and not delivering a notification signal to said another user if said event signals to not match said second profile.

19. A method as set forth in claim 17, including the steps of:

comparing said event signals to a second profile of events corresponding to the user; and, delivering a second notification signal to the user if said event signals match said second profile.

20. A method as set forth in claim 17, wherein the step of delivering said event signal includes the step of delivering said event signal to said remote site using a radio datalink.

21. A method as set forth in claim 17, wherein the step of delivering said event signal includes the step of delivering said event signal to said remote site using a satellite datalink.

22. A method for providing information relating to a machine to a user, comprising:

sensing predetermined events relating to the machine and producing corresponding event signals;

delivering said event signals to a remote site;

comparing said event signals to a profile of events corresponding to the user;

delivering a notification signal to the user if said event signals match said profile;

comparing said event signals to a second profile of events corresponding to the user; and, delivering a second notification signal to the user if said event signals match said second profile.

* * * * *